(12) United States Patent
Cochrane et al.

(10) Patent No.: US 6,560,594 B2
(45) Date of Patent: *May 6, 2003

(54) CUBE INDICES FOR RELATIONAL DATABASE MANAGEMENT SYSTEMS

(75) Inventors: Roberta Jo Cochrane, Los Gatos, CA (US); George Lapis, San Jose, CA (US); Ting Yu Leung, San Jose, CA (US); Mir Hamid Pirahesh, San Jose, CA (US); Yang Sun, Sunnyvale, CA (US); Markos Zaharioudakis, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/401,474

(22) Filed: Sep. 22, 1999

(65) Prior Publication Data

US 2002/0138460 A1 Sep. 26, 2002

Related U.S. Application Data

(60) Provisional application No. 60/133,934, filed on May 13, 1999.

(51) Int. Cl.$^7$ ............................................. G06F 7/00
(52) U.S. Cl. ............................................. 707/2; 707/3
(58) Field of Search ........................................ 707/1–10

(56) References Cited

U.S. PATENT DOCUMENTS

| | | | | |
|---|---|---|---|---|
| 5,940,818 A | * | 8/1999 | Malloy et al. | 707/2 |
| 5,963,936 A | * | 10/1999 | Cochrane et al. | 707/3 |
| 6,141,655 A | * | 10/2000 | Johnson et al. | 707/2 |
| 6,460,027 B1 | * | 10/2002 | Cochrane et al. | 707/2 |
| 6,484,159 B1 | * | 11/2002 | Mumick et al. | 707/2 |

OTHER PUBLICATIONS

"Mainteneance of Data Cubes and Summary Tables in a warehouse"—Inderpal Singh Mumick, Dallan Quass and Barinderpal Singh Mumick—1997 ACM 0–89791–911–4/97/0005 (pp. 100–111).*

"Improved Query Performance with Variant Indexes"—Patrick O'Neil and Dallan Quass—1997 ACM 0–89791–911–4/97/0005 (p 38–49).*

Maintenance of Cube Automatic Summary Tables—Wolfgang Lehner, Richard Sidle, Hamid Pirahesh and Roberta Cochrane ACM 2000 1–58113–218–2/00/05 (pp. 512–513).*

"Answering Complex SQL Queries Using Automatic Summary Tables"—Markos Zaharioudakis, Roberta Cochrane, George Lapis, Hamid Pirahesh and Monica Urata—ACM 200 1–58113–218–2/00/05 (pp. 105–116).*

"Examole–Based Graphical Database Query Languages"—Gultekin Ozsoyoglu & Huaqing Wang—May 1993 IEEE (pps: 25–38).*

"Index selection for OLAP"—Himanshu Gupta, Venky Harinarayan and Anand Rajaraman—1997 IEEE, (pps: 208–219).*

* cited by examiner

Primary Examiner—Hosain T. Alam
Assistant Examiner—Anh Ly
(74) Attorney, Agent, or Firm—Gates & Cooper LLP

(57) ABSTRACT

A method, apparatus, and article of manufacture for optimizing database queries using subsumption tests between the query and at least one summary table that comprises a cube index to determine whether an expression in the query can be subsumed in the summary table. The summary table stores at least one materialized view involving at least one GROUP BY operation that computes at least one of the following: (1) a cube, (2) a rollup, (3) a grouping set, and (4) a concatenation of cubes, rollups, grouping sets, and one or more grouping items. When the expression in the query can be subsumed in the summary table, the query is rewritten to use the summary table.

57 Claims, 6 Drawing Sheets

CUBE INDICES FOR RELATIONAL DATABASE MANAGEMENT SYSTEMS

CROSS-REFERENCE TO RELATED APPLICATIONS

This application claims the benefit under 35 U.S.C. §119 (e) of co-pending and commonly-assigned U.S. Provisional application serial number 60/133,934, entitled "CUBE INDICES FOR RELATIONAL DATABASE MANAGEMENT SYSTEMS," filed on May 13, 1999 expired, by Roberta J. Cochrane, George Lapis, Ting Y. Leung, Mir H. Pirahesh, Yang Sun, and Markos Zaharioudakis, which application is incorporated by reference herein.

This application is also related to the following co-pending and commonly-assigned patent applications:

Application Ser. No. 08/885,485, entitled "A QUERY PROCESSING SYSTEM THAT COMPUTES GROUPING SETS, ROLLUP, AND CUBE WITH A REDUCED NUMBER OF GROUP BYS IN A QUERY GRAPH MODEL", filed Jun. 30, 1997, by Roberta J. Cochrane, Michelle M. Jou, George Lapis, and Mir H. Pirahesh now U.S. Patent No. 5,963,936, issued Oct. 5, 1999; and Application Ser. No. 09/152,559, entitled "AUTOMATIC RECOGNITION AND REROUTING OF QUERIES FOR OPTIMAL PERFORMANCE", filed Sep. 14, 1998, by Roberta J. Cochrane, George Lapis, Ting Y. Leung, Mir H. Pirahesh, and Monica S. Urata now U.S. Patent No. 6,460,027, issued Oct. 1, 2002;

both of which applications are incorporated by reference herein.

BACKGROUND OF THE INVENTION

1. Field of the Invention

This invention relates in general to database management systems performed by computers, and in particular, to the use of cube indices for optimizing queries in a relational database management system.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American National Standards Organization (ANSI) and the International Standards Organization (ISO).

RDBMS software typically has the capability of analyzing data based on .particular columns of a table. For example, rows can be grouped according to columns defined in a GROUP BY clause of a query. The column names in a SELECT clause are either a grouping column or a column function. Column functions return a result for each group defined by the GROUP BY clause.

A grouping query can include a standard WHERE clause that eliminates non-qualifying rows before the groups are formed and the column functions are computed. A HAVING clause eliminates non-qualifying rows after the groups are formed; it can contain one or more predicates connected by ANDs and ORs, wherein each predicate compares a property of the group (such as AVG(SALARY)) with either another property of the group or a constant.

The GROUPING SET operator extends the GROUP BY operation to simultaneously specify the computation of multiple GROUP BYs in a single GROUP BY operation. When the GROUPING SET operator is used, a NULL value in a non-null grouping column denotes that the particular column is collapsed in the aggregation. If a grouping column (c) is nullable, a GROUPING operator (GROUPING(c)) is required to distinguish between the NULL group and a column collapsed in the aggregation. Used in conjunction with grouping sets, the GROUPING operator returns a value which indicates whether or not a row returned in a GROUP BY answer set is a row generated by a grouping set that excludes the column represented by the expression. The argument can be of any type, but must be an item of a GROUP BY clause. The result of the function is set to one of the following values:

1—The value of expression in the returned row is a null value, and the row was generated by a super-group. That is, the argument is collapsed in the aggregation.

0—The value of the expression in the returned row represents a non-system generated value of the group (which may be null) and indicates that the argument is not collapsed in the aggregation.

ROLLUP and CUBE operations can also be specified in the GROUP BY clause of a query. ROLLUP and CUBE operations are shorthand for GROUPING SETs that represent common sets of GROUP BY operations that are required for common queries for online analytical processing (OLAP). ROLLUP grouping produces a result set containing the regular grouped rows and sub-total rows. CUBE grouping produces a result set containing the rows from ROLLUP and cross-tabulation rows. For example, ROLLUP can provide the sales by person by month with monthly sales totals and an overall total. In another example, CUBE can include additional rows for total sales by person.

For most RDBMS software, combinations of tables and views are used to access data stored in tables in the database. Indices are often used to improve the performance of retrieving data from tables. However, indices are generally limited to columns from base tables. Thus, indices are not seen as suitable for:

results of aggregations, and results of joins for commonly used subsets of the data.

A view definition includes a query that, if processed, provides a temporary results table based on the results of the query at that point in time. Using an INSERT statement and an appropriately defined table in the database, the temporary results table can be stored in the database. To refresh this table, the user would need to perform a DELETE from the table and then perform the INSERT again.

Users can directly query against the created table, provided that the users are aware how the results were derived. Generally, the RDBMS software is not aware that such a table is any different from any other table in the database. Moreover, this table cannot be used by an optimizer within the RDBMS software to improve performance, even though the table may contain data that would drastically improve the performance of other queries.

This leads to the notion of summary tables or materialized views as envisioned by the present invention. These tables are similar to the created table described above, except that the definition of the table is based on a "full select" (much like a view) that is materialized in the table. The columns of the table are based on the elements of the select list of the full select.

In the present invention, with properly defined summary tables, the RDBMS software is now aware how the result in the summary table was derived. When an arbitrarily complex query is submitted, an optimizer in the RDBMS software can now consider using the summary tables to answer the query, which is a technique that requires performing subsumption tests between the query and summary table definition, and then performing compensation work once the optimizer decides that the summary table can be used for the answer.

There are extensive research activities and literature on this topic, as disclosed in the following publications, all of which are incorporated by reference herein:

1. L. S. Colby, R. L. Cole, E. Haslam, N. Jazaeri, G. Johnson, W. J. McKenna, L. Schumacher, D. Wilhite. Red Brick Vista: Aggregate Computation and Management. Proceedings of the 14th Int'l. Conference on Data Engineering, Orlando, Fla., 1998.

2. R. Bello, K. Dias, A. Downing, J. Feenan, J. Finnerty, W. Norcott, H. Sun, A. Witkowski, M. Ziauddin. Materialized Views In Oracle. Proceedings of the 24th VLDB Conference, N.Y., 1998.

3. D. Srivastava, S. Dar, H. Jagadish, A. Levy. Answering Queries with Aggregation Using Views. Proceedings of the 22nd VLDB Conference, Mumbai, India, 1996.

4. R. Cochrane and N. Mattos. Super Sets—Concatenation and Grouping Sets. ISO Document DBL LGW-34 X3H2-97-?, Jul. 23, 1997. This should also be in the currently published version of the SQL3 standard.

However, the current state of the art does not allow queries to be optimized using summary tables that are defined using grouping expressions containing GROUPING SETs, ROLLUPs, and CUBEs.

SUMMARY OF THE INVENTION

To overcome the limitations in the prior art described above, and to overcome other limitations that will become apparent upon reading and understanding the present specification, the present invention discloses a method, apparatus, and article of manufacture for optimizing database queries using subsumption tests between the query and at least one summary table that comprises a cube index to determine whether an expression in the query can be subsumed in the summary table. The summary table stores at least one materialized view involving at least one GROUP BY operation that computes at least one of the following: (1) a cube, (2) a rollup, (3) a grouping set; and (4) a concatenation of cubes, rollups, grouping sets, and one or more grouping items. When the expression in the query can be subsumed in the summary table, the query is rewritten to use the summary table.

It is an object of the present invention to make the RDBMS aware of how a result in a summary table was derived, so that an optimizer function of the RDBMS can use the summary tables to respond to queries. The techniques presented in the present invention involve complex and yet efficient subsumption tests among queries and are directly applicable to other areas such as multiple query optimization.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

Hardware Environment

Figure 1:
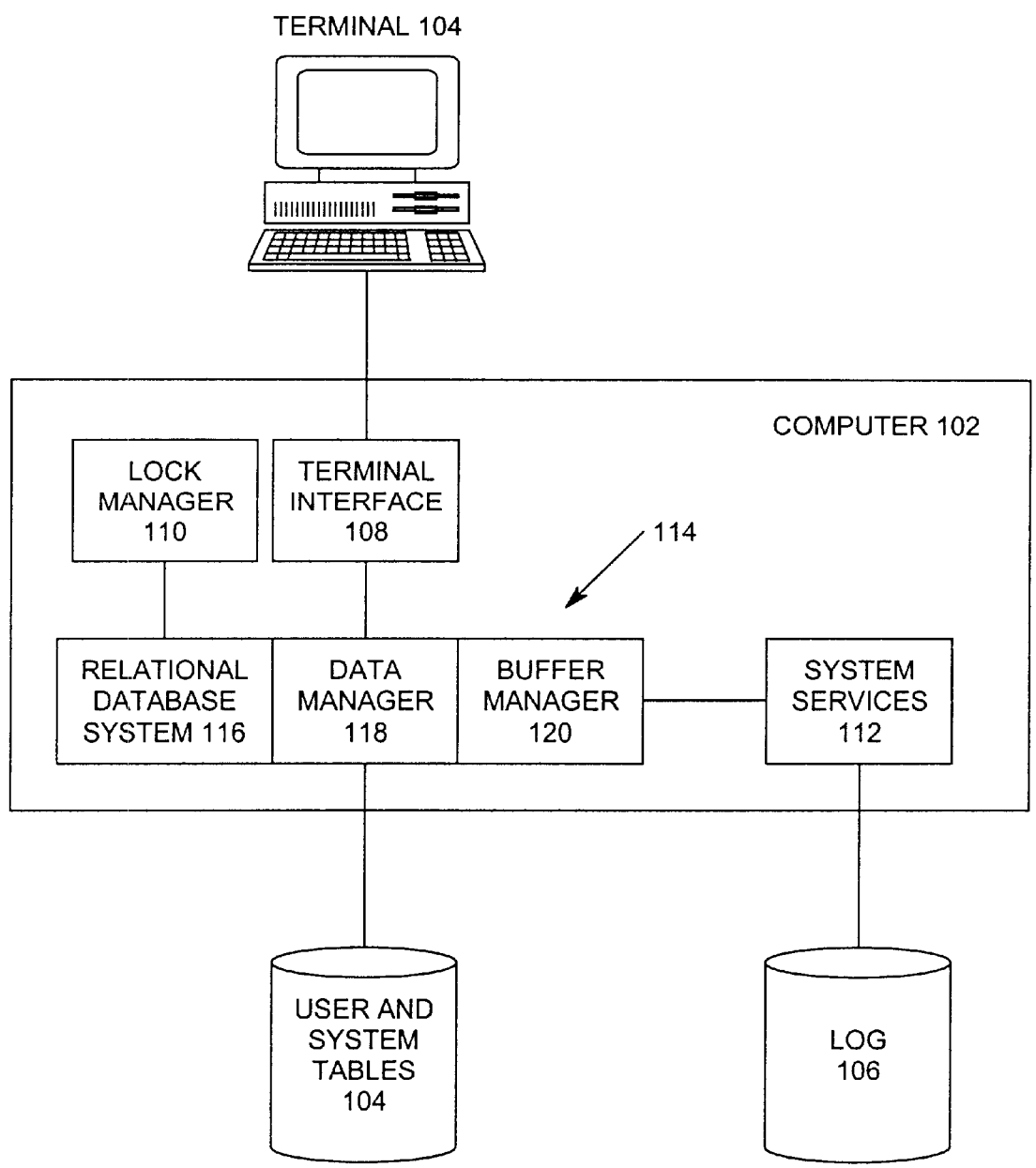
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more data storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software.

As illustrated in FIG. 1, the DB2 product includes three major components: the Resource Lock Manager (RLM) 110, the Systems Services module 112, and the Database Services module 114. The RLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the heart of the DB2 architecture is the Database Services module 114. The Database Services module 114 contains several submodules, including the Relational Database System (RDS) 116, the Data Manager 118, and the Buffer Manager 120, as well as other elements such as an SQL compiler/interpreter. These submodules support the functions of the SQL language, i.e., definition, access control, retrieval, and update of user and system data.

Generally, each of the components, modules, and submodules of the RDBMS software comprise instructions and/or data, and are embodied in or retrievable from a computer-readable device, medium, or carrier, e.g., a memory, a data storage device, a remote device coupled to the computer 102 by a data communications device, etc. Moreover, these instructions and/or data, when read, executed, and/or interpreted by the computer 102, cause the computer 102 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass a computer program accessible from any computer-readable device, carrier, or media.

Of course, those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Interactive SQL Execution

Figure 2:
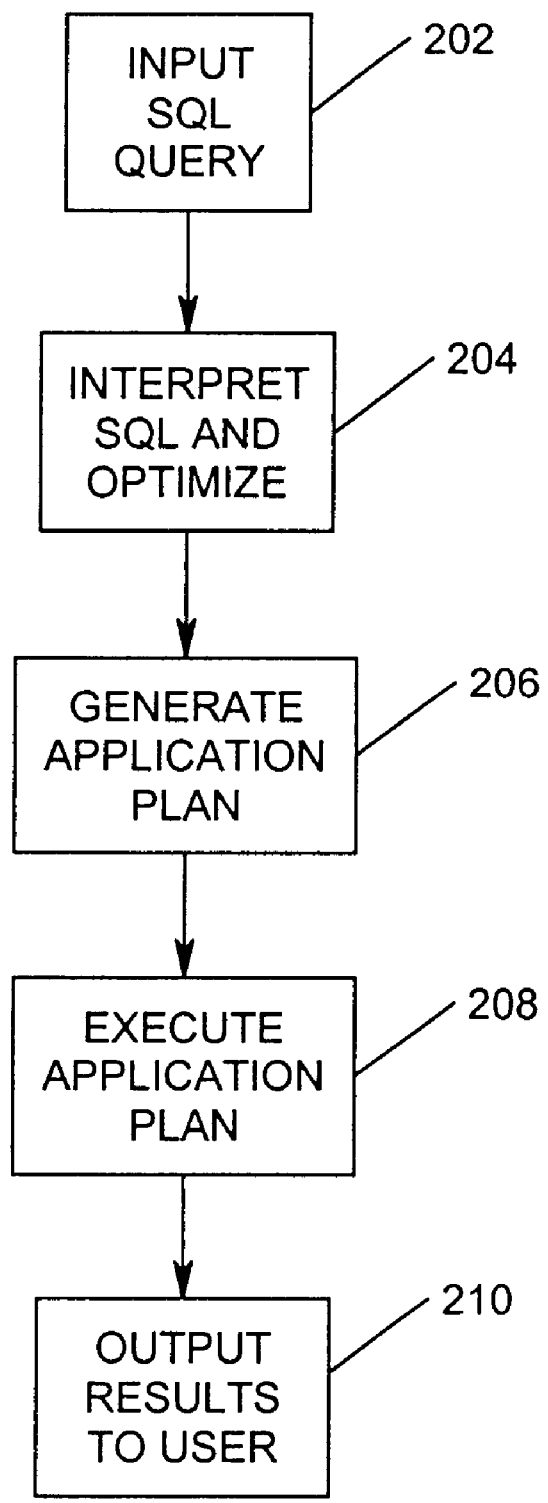
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102. Block 204 represents the step of compiling or interpreting the SQL statements. An optimization function within block 204 may transform or optimize the SQL query in a manner described in more detail later in this specification. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Block 206 represents the step of generating a compiled set of runtime structures called an application plan from the compiled SQL statements. Block 208 represents the execution of the application plan and Block 210 represents the output of the results.

Embedded/Batch SQL Execution

Figure 3:
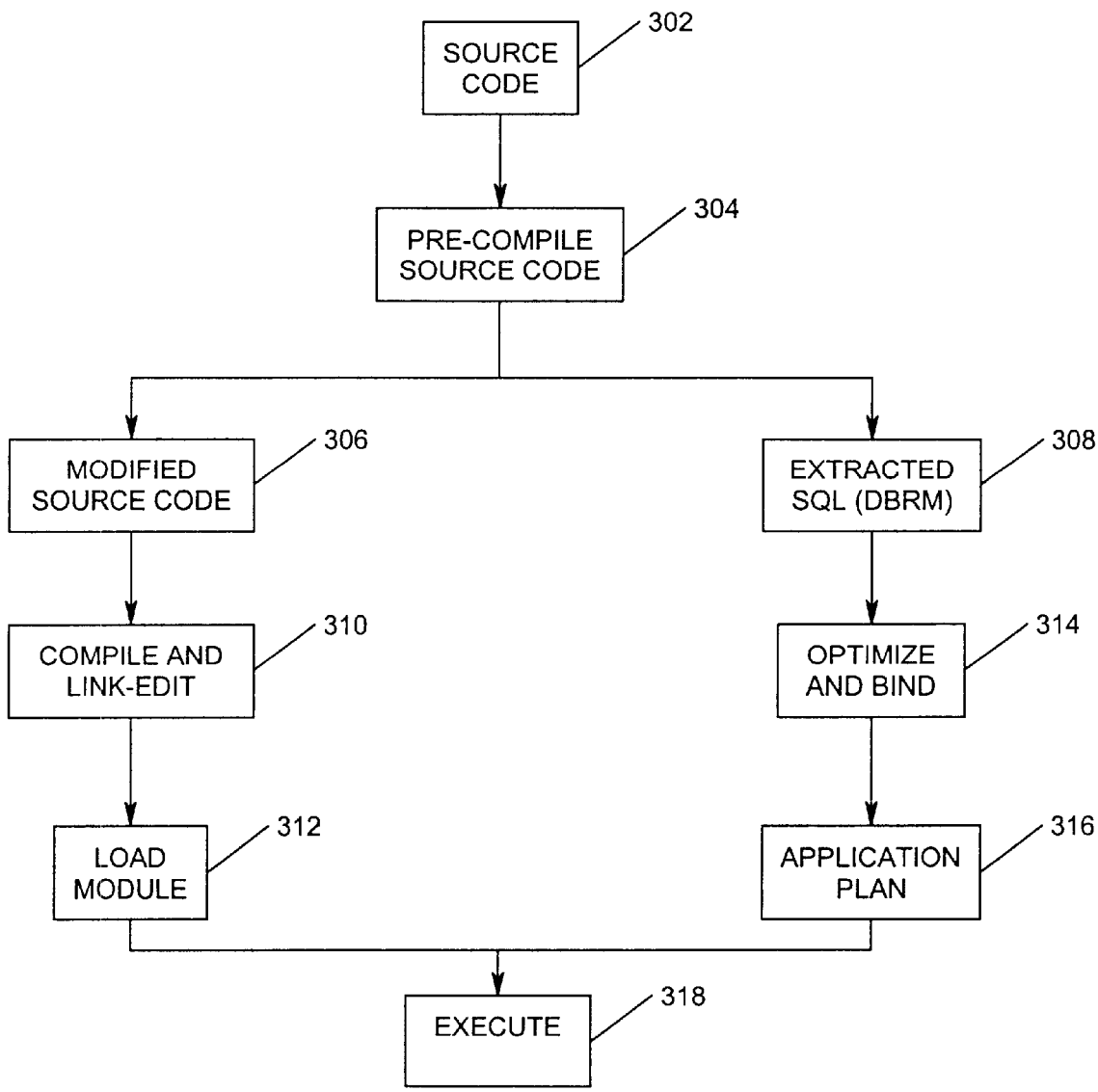
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (Such as COBOL or C) and embedded SQL statements. The program source code is then input to a pre-compile step 304. There are two outputs from the pre-compile step 304: a modified source module 306 and a Database Request Module DBRM) 308. The modified source module 306 contains host language calls to DB2, which the pre-compile step 304 inserts in place of SQL statements. The DBRM 308 is comprised of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the desired data, but not how to retrieve the data. The optimize and bind step 314 may optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Description of the Optimization Technique

The present invention discloses an improved optimization technique that is typically performed at step 204 of FIG. 2 or step 314 of FIG. 3. Specifically, the present invention discloses an improved SQL query compilation and optimization technique using Query Graph Model (QGM).

A QGM represents a semi-procedural dataflow graph of a query, wherein the QGM is basically a high-level, graphical representation of the query. Boxes are used to represent relational operations, while arcs between boxes are used to represent quantifiers, i.e., table references. Each box includes the predicates that it applies, an input or output order specification (if any), a distinct flag, and so on. The basic set of boxes include those for SELECT, GROUP BY, and UNION. A join operation is represented by a SELECT box with two or more input quantifiers, while an ORDER BY operation is represented by a SELECT box with an output order specification.

Many SQL query compilation and optimization techniques using the Query Graph Model (QGM) have been performed in the prior art, as disclosed in the publication, Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, which is incorporated by reference herein.

The operation of the present invention can best be understood in context, i.e., using a real-world example, such as a data warehouse application performed by the RDBMS software. Consider a credit card company storing credit card customer information, their credit card accounts, and transactions that customers made using credit cards for purchases.

Figure 4:
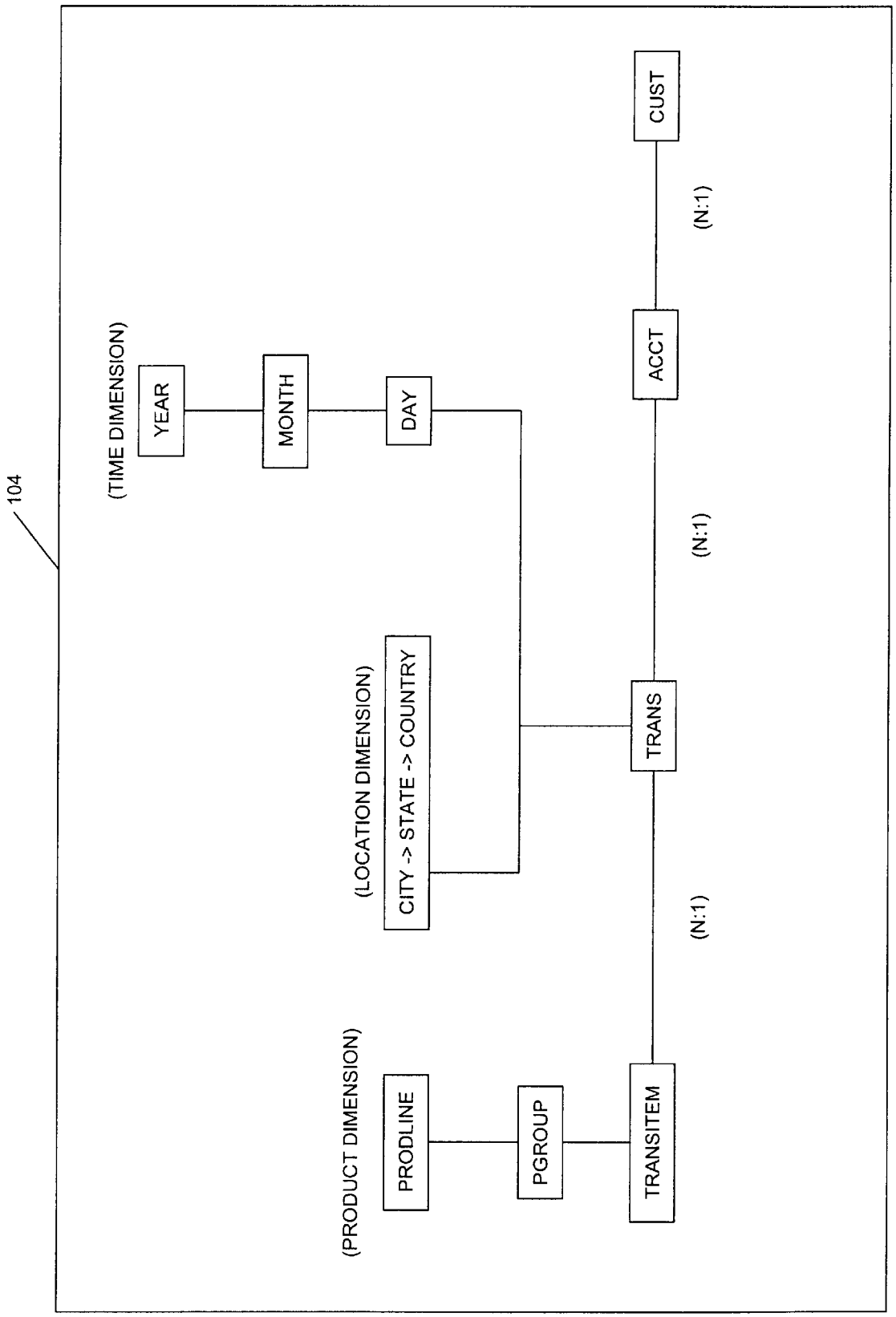
FIG. 4 is a block diagram that illustrates a star schema for a relational database.

A possible database schema, comprising a "star" schema, is illustrated by FIG. 4 and described below:

Table CUST contains customer information.

Table ACCT contains credit card account information. Each customer may have one or more credit cards (i.e., one or more accounts).

Table TRANS contains transaction information. A customer may make a number of purchases using a particular credit card, and the transaction information is stored in table TRANS. Each transaction was made at a particular time and in a particular store. The purchase time and location can be aggregated along time and location dimensions.

Table PRODLINE contains information about product lines and table PGROUP contains product category information.

Table TRANSITEM contains information about transactions on each item. In each transaction, any number of items may be purchased, and TRANSITEM stores this information and the product information can be aggregated along the product line hierarchy.

The following "CREATE TABLE" statements may be used to create the tables shown in FIG. 4.

```
CREATE TABLE STARS.CUST(
    CUSTID INT NOT NULL PRIMARY KEY,
    MARITAL_STATUS CHAR(1),
    INCOME_RANGE INT NOT NULL,
    ZIPCODE INT,
    RESIDENCE VARCHAR(5));
CREATE TABLE STARS.ACCT(
    ACCTID INT NOT NULL PRIMARY KEY,
    CUSTID INT NOT NULL,
    CONSTRAINT CUST_ACCT FOREIGN KEY (CUSTID)
        REFERENCE STARS.CUST);
CREATE TABLE STARS.LOC(
    LOCID INT NOT NULL PRIMARY KEY,
    CITY VARCHAR(10),
    STATE CHAR(2),
    COUNTRY VARCHAR(10));
CREATE TABLE STARS.TRANS(
    TRANSCID INT NOT NULL PRIMARY KEY,
    ACCTID INT NOT NULL,
    PDATE DATE NOT NULL,
    STATUS VARCHAR(15),
    LOCID INT NOT NULL,
    CONSTRAINT ACCT_TRANS FOREIGN KEY (ACCTID)
        REFERENCE STARS.ACCT,
    CONSTRAINT LOC_ACCT FOREIGN KEY (LOCID)
        REFERENCE STARS.LOC);
CREATE TABLE STARS.PRODLINE(
    LINEID INT NOT NULL PRIMARY KEY,
    NAME VARCHAR(20));
CREATE TABLE STARS.PGROUP(
    PGID INT NOT NULL PRIMARY KEY,
    NAME VARCHAR(12),
    LINEID INT NOT NULL,
    CONSTRAINT PRODLINE_PGROUP FOREIGN KEY (LINEID)
        REFERENCES STARS.PRODLINE);
CREATE TABLE STARS.TRANSITEM(
    TRANSITEMID INT NOT NULL PRIMARY KEY,
    TRANSID INT NOT NULL,
    AMOUNT DECIMAL(10,2) NOT NULL,
    PGID INT NOT NULL,
    CONSTRAINT TRANS_TRANSITEM FOREIGN KEY
        (TRANSID) REFERENCES STARS.TRANS,
CONSTRAINT PGROUP_TRANSITEM FOREIGN KEY (PGID)
        REFERENCES STARS.PGROUP);
```

With these base tables populated with data, one or more summary tables or materialized views can be created in the database that keep the number of transactions for each account and location.

The following "CREATE TABLE" statement may be used to define one of the summary tables:

```
CREATE TABLE DBA.LOC_SALESSUM AS (
    SELECT LOC.COUNTRY, LOC.STATE, LOC.CITY,
        SUM(TI.AMOUNT) AS AMOUNT,
        COUNT(*) AS COUNT,
        GROUPING(LOC.COUNTRY) AS G_COUNTRY,
        GROUPING(LOC.STATE) AS G_STATE,
        GROUPING(LOC.CITY) AS G_CITY
    FROM STARS.TRANSITEM AS TI, STARS.TRANS AS T,
        STARS.LOC AS LOC, STARS.PGROUP AS PG,
        STARS.PRODLINE AS L
    WHERE TI.TRANSIID = T.TRANSID AND
        TI.PGID = PG.PGID AND
        PG.LINEID = L.LINEID AND
        T.LOCID = LOC.LOCID
    GROUP BY ROLLUP(LOC.COUNTRY, LOC.STATE,
        LOC.CITY)) DATA INITIALLY DEFERRED
    REFRESH DEFERRED
```

The table LOC_SALESSUM contains rows that represent the following groupings:

1) sum of sales by country, state, city,
2) sum of sales by country, state,
3) sum of sales by country, and
4) sum of all sales.

This summary table is considered a "Cube Index", which is a general term applied to any summary table or materialized view generated using GROUPING, ROLLUP, or CUBE operations. Further, a "slice" of this Cube Index is comprised of one or more groupings of a grouping set.

Consider a query that returns sum of sales by country:

```
Q1:    SELECT LOC.COUNTRY, SUM(TI.AMOUNT) AS AMOUNT
       FROM STARS.TRANSITEM AS TI, STARS.TRANS AS T,
           STARS.LOC AS LOC
       WHERE TI.TRANSID = T.TRANSID AND
           T.LOCID = LOC.LOCID
       GROUP BY LOC.GOUNTRY;
```

An optimizer can reroute the query Q1 using a "Cube Slicing" technique as described later in this specification. An example of the rerouted query is provided below:

```
NEW Q1:    SELECT COUNTRY, AMOUNT
           FROM DBA.LOC_SALESSUM
           WHERE G_COUNTRY = 0 AND G_STATE = 1 AND
               G_CITY = 1
```

Notice that the new query simply selects the rows from LOC_SALESSUM that participate in the third grouping contained in LOC_SALESSUM as described above.

Now, consider a query that returns sum of sales by country, state:

```
Q2:    SELECT LOG.COUNTRY, LOC.STATE,
           SUM(TI.AMOUNT) AS AMOUNT
       FROM STARS.TRANSITEM AS TI, STARS.TRANS AS T,
           STARS.LOC AS LOC
       WHERE TI.TRANSID = T.TRANSID AND
           T.LOCID = LOC.LOCID
       GROUP BY LOC.COUNTRY, LOC.STATE
```

An optimizer can reroute the query Q2 using a Cube Slicing technique as described later in this specification. An example of the rerouted query is provided below:

```
NEW Q2:    SELECT COUNTRY, STATE,
               AMOUNT
           FROM DBA.LOC_SALESSUM
           WHERE G_COUNTRY = 0 AND G_STATE = 0
               AND G_CITY = 1
```

Notice that the new query simply selects the rows from LOC_SALESSUM that participate in the second grouping contained in LOC_SALESSUM as described above.

Now, consider a query that returns sum of sales by country, state:

```
Q3:    SELECT LOC.COUNTRY, LOC.STATE,
           SUM(TI.AMOUNT) AS AMOUNT
       FROM STARS.TRANSITEM AS TI, STARS.TRANS AS T,
           STARS.LOC AS LOC
       WHERE TI.TRANSID = T.TRANSID AND
           T.LOCID = LOC.LOCID AND
           (LOC.CITY = 'RICHMOND' OR
           LOC.CITY = 'VANCOUVER')
       GROUP BY LOC.GOUNTRY, LOC.STATE
```

An optimizer can reroute the query Q3 using a Cube Slicing technique as described later in this specification. An example of the rerouted query is provided below:

```
NEW Q3:   SELECT COUNTRY, STATE,
              SUM(AMOUNT) AS AMOUNT
          FROM DBA.LOC_SALESSUM
          WHERE G_COUNTRY = 0 AND G_STATE = 0
              ANDG_CITY = 0
              AND (CITY = 'RICHMOND'
              OR CITY = 'VANCOUVER')
          GROUP BY COUNTRY, STATE
```

Note that in order to apply the predicate on the value of city, a "slice" is selected from the summary table (i.e., Cube Index) that corresponds to the first grouping contained in LOC_SALESSUM as described above. When this is done, the system must regroup on country and state to produce the answers for the query.

Now, consider a query that returns sum of sales by country, state and the sum of sales by country, and the sum of all sales.

```
Q3A:   SELECT LOC.COUNTRY, LOC.STATE,
           SUM(TI.AMOUNT) AS AMOUNT
       FROM STARS.TRANSITEM AS TI, STARS.TRANS AS T,
           STARS.LOC AS LOC
       WHERE TI.TRANSID = T.TRANSID AND
           T.LOGID = LOC.LOCID
       GROUP BY ROLLUP(LOC.COUNTRY, LOC.STATE)
```

An optimizer can reroute the query Q3A using a Cube Slicing technique as described later in this specification. An example of the rerouted query is provided below:

```
NEW Q3A:  SELECT COUNTRY, STATE, AMOUNT
          FROM DBA.LOC_SALESSUM
          WHERE (G_COUNTRY = 0 AND G_STATE = 0
              AND G_CITY = 1) OR
              (G_COUNTRY = 0 AND G_STATE = 1 AND
              G_CITY = 1) OR
              (G_COUNTRY = 1 AND G_STATE = 1 AND
              G_CITY = 1)
```

Note that since there are no extra predicates in the query that are not also applied in the summary table, the method can select exactly the slices needed from the summary table (i.e., Cube Index) and need not perform any further regrouping.

Now, consider the summary table defined by the following "CREATE TABLE" statement:

```
TABDEF 2:
CREATE TABLE DBA.PG_SALESSUM AS (
    SELECT PG.PGID, LOC.COUNTRY,
        YEAR(T.PDATE) AS YEAR,
        SUM(TI.AMOUNT) AS AMOUNT,
        COUNT(*) AS COUNT,
        GROUPING(PG.PGID) AS G_PGID,
        GROUPING(LOC.COUNTRY) AS G_COUNTRY,
        GROUPING(YEAR(T.PDATE)) AS G_YEAR
    FROM STARS.TRANSITEM AS TI, STARS.TRANS AS T,
        STARS.LOC AS LOC, STARS.PGROUP AS PG,
        STARS.PRODLINE AS L
    WHERE TI.TRANSID = T.TRANSID
        AND TI.PGID = PG.PGID AND
        PG.LINEID = L.LINEID AND
        T.LOCID = LOC.LOCID
    GROUP BY CUBE(PG.PGID, LOC.COUNTRY,
        YEAR(T.PDATE)))
    DATA INITIALLY DEFERRED REFRESH DEFERRED;
```

The table PG_SALESSUM contains rows representing $2**3=8$ GROUP BYs:

1) sum of sales by product group, country, year, 2) sum of sales by product group, country, 3) sum of sales by product group, year, 4) sum of sales by product group, 5) sum of sales by country, year, 6) sum of sales by country, 7) sum of sales by year, and 8) sum of all sales.

The following table definition is equivalent to TABDEF2 above:

```
TABDEF3:
CREATE TABLE DBA.PG_SALESSUM AS (
    SELECT PG.PGID, LOC.COUNTRY,
        YEAR(T.PDATE) AS YEAR,
        SUM(TI.AMOUNT) AS AMOUNT,
        COUNT(*) AS COUNT,
        GROUPING(PG.PGID) AS G_PGID,
        GROUPING(LOC.COUNTRY) AS G_COUNTRY,
        GROUPING(YEAR(T.PDATE)) AS G_YEAR
    FROM STARS.TRANSITEM AS TI, STARS.TRANS AS T,
        STARS.LOC AS LOC, STARS.PGROUP AS PG,
        STARS.PRODLINE AS L
    WHERE TI.TRANSID = T.TRANSID AND
        TI.PGID = PG.PGID AND
        PG.LINEID = L.LINEID AND
        T.LOCID = LOC.LOCID
    GROUP BY ROLLUP(PG.PGID), ROLLUP(LOC.COUNTRY),
        ROLLUP(YEAR(T.PDATE)))
    DATA INITIALLY DEFERRED REFRESH DEFERRED;
```

Consider again the query that returns sum of sales by country:

```
Q4:    SELECT LOC.COUNTRY, SUM(TI.AMOUNT) AS
           AMOUNT
       FROM STARS.TRANSITEM AS TI, STARS.TRANS AS T,
           STARS.LOC AS LOC
       WHERE TI.TRANSID = T.TRANSID AND
           T.LOCID = LOC.LOCID
       GROUP BY LOC.COUNTRY;
```

-continued

```
NEW Q4:   SELECT COUNTRY, AMOUNT
          FROM DBA.PG_SALESSUM
          WHERE G_COUNTRY = 0 AND G_PGID = 1 AND
             G_YEAR = 1;
```

Logic of Creating the Summary Table

Figure 5:
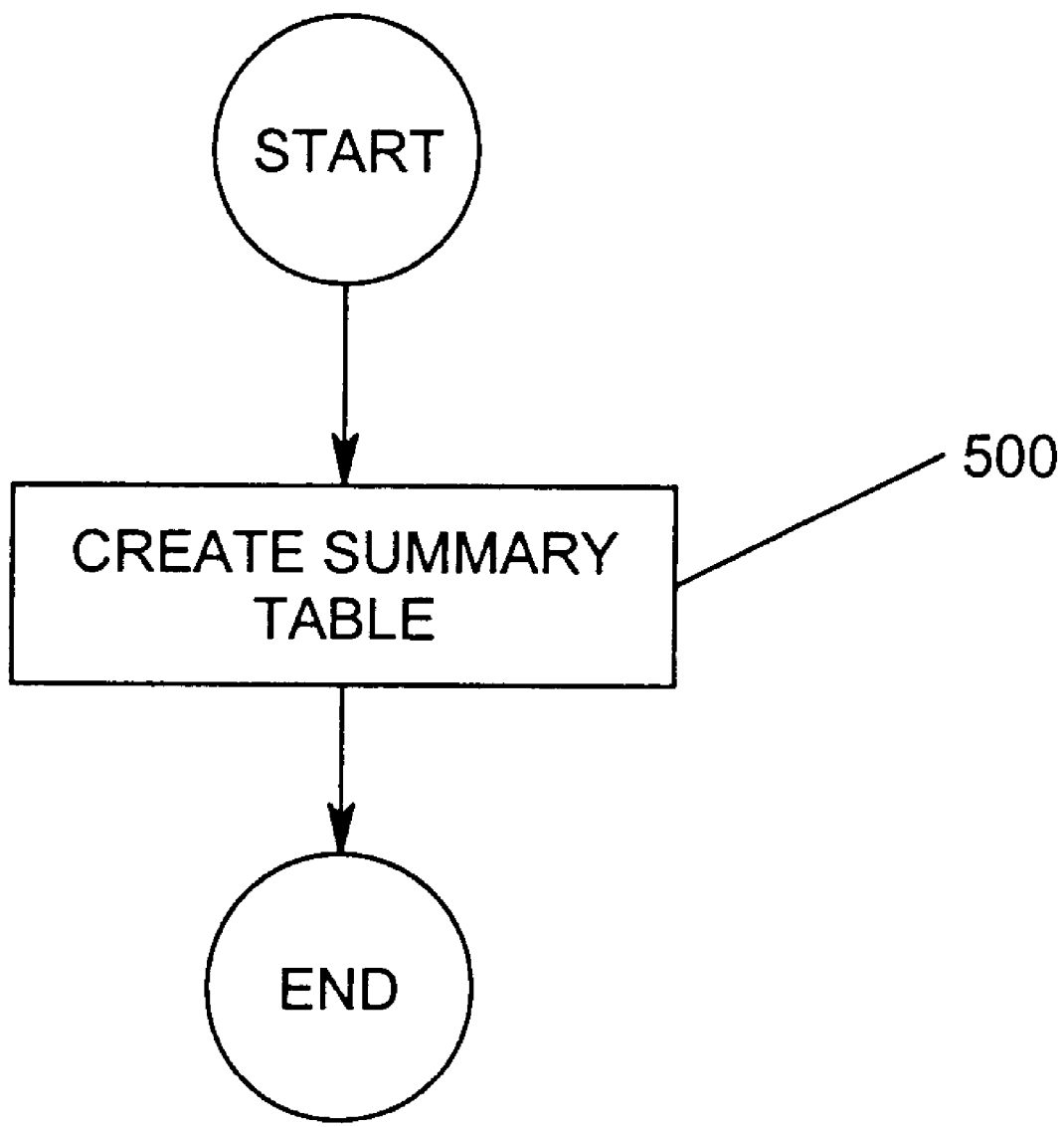
FIG. 5 is a flowchart illustrating the method of creating the summary table according to the preferred embodiment of the present invention.

FIG. 5 is a flowchart illustrating the method of creating the summary table according to the preferred embodiment of the present invention.

Block 500 represents the computer system 100 creating a summary table that contains the result of executing a query, wherein a definition of the summary table is based on a full select statement.

Logic of the Optimization Technique

Figure 6:
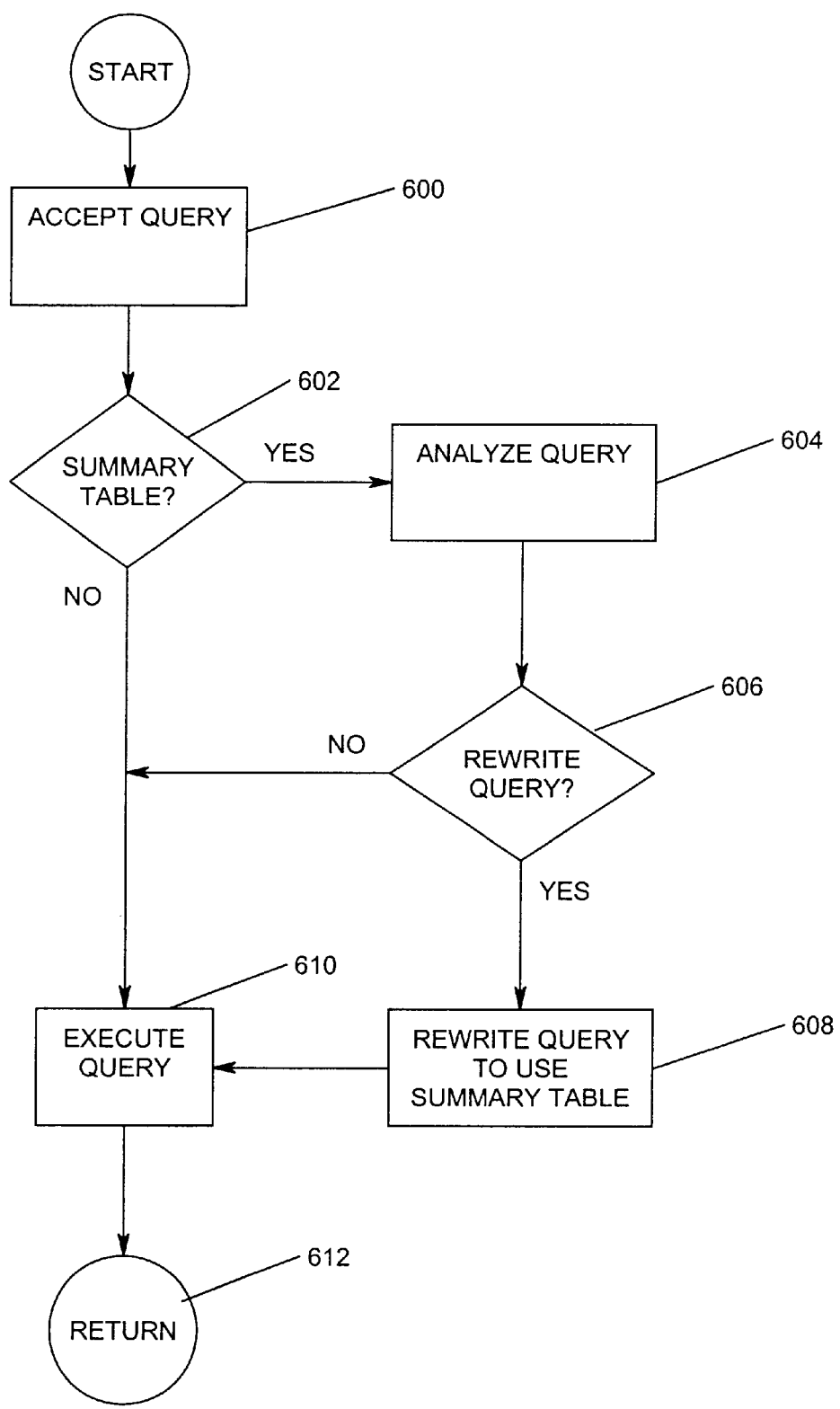
FIG. 6 is a flowchart illustrating the method of optimizing SQL queries according to the preferred embodiment of the present invention.

FIG. 6 is a flowchart illustrating the method of optimizing SQL queries in step 204 of FIG. 2 and step 314 of FIG. 3 according to the preferred embodiment of the present invention.

Block 600 represents the computer system 100, specifically an optimizer function of the RDBMS software 106, accepting a query.

Block 602 is a decision block that represents the computer system 100 determining whether there is one or more summary tables referencing one or more tables in the query. If so, control transfers to Block 604; otherwise, control transfers to Block 610.

Block 604 represents the computer system 100 analyzing whether a summary table can be used to answer the query. Specifically, this Block performs subsumption tests between the query and the definition of the summary table to determine whether expressions occurring anywhere in the query, but not in the summary table, can be subsumed in the summary table. The query block by query block logic is as follows:

If the query block is a SELECT, wherein QBS is the query block in the summary table definition and QBQ is the query block in the query:
1. The QBS must not apply predicates that are not contained in QBQ. Otherwise, the summary table results would not be complete, i.e., it would not contain records that satisfy the results of the query.
2. The QBQ must not reference columns that are not derivable from the results of QBS.

If the query block is a GROUP BY, wherein QBS is the query block in the summary table definition and QBQ is the query block in the query:
1. The QBQ must not reference columns that are not derivable from the results of QBS. Hence, aggregate functions in the QBQ must be computable using some set of columns in the result of QBS as intermediate results. If QBQ computes distinct aggregate function, then the arguments of the aggregate function must be grouping items in QBS.
2. The grouping items in QBS must contain a slice that supports the grouping items in QBQ.

In such groupings, the following definitions are applied. A "simple" GROUP BY clause contains a single grouping set consisting of the single expression elements in the GROUP BY clause. A "non-simple" GROUP BY clauses are those described in R. Cochrane and N. Mattos, "Super Sets—Concatenation and Grouping Sets," ISO Document DBL LGW-34X3H2-97-?, Jul. 23, 1997, which is incorporated by reference herein. It is a GROUP BY clause with a grouping sets specification or a GROUP BY clause whose elements include those that specify CUBE or ROLLUP. Note that all of these cases specify a set of groups that are UNIONed together in the same result.

(a) If both QBS and QBQ are simple GROUP BY clauses (i.e., does not contain GROUPING SETs, CUBEs, or ROLLUPs), then the QBS contains a slice that supports the grouping items in QBQ if the grouping items in QBQ are a subset, not necessarily proper, of the grouping items in QBS.

(b) If QBS is a simple GROUP BY clause (i.e., does not contain GROUPING SETs, CUBEs, or ROLLUPs) and QBQ is not a simple GROUP BY clause, then the QBS contains a slice that supports QBQ if the grouping items in QBQ are a subset, not necessarily proper, of the grouping items in QBS. The results of QBQ are computed by applying the operations of QBQ using QBS as the input rather than the underlying query containing base tables.

(c) If the QBS is not a simple GROUP BY clause and QBQ is a simple GROUP BY clause, then the QBS contains a slice that supports the grouping items in QBQ if the resulting grouping sets of QBS contains a grouping set whose elements are a superset, not necessarily proper, of the grouping items in QBQ and any columns required in QBQ to apply predicates that are not in QBS.

(d) If the QBS is not a simple GROUP BY clause and QBQ is not a simple GROUP BY clause, then the QBS contains a slice that supports QBQ if the resulting grouping sets of QBS contains a grouping set whose elements are a superset, not necessarily proper, of the grouping items in QBQ and any columns required in QBQ to apply predicates that are not in QBS.

For cases (c) and (d), there are many ways to compute the results of QBQ from QBS (some more efficient than others), depending on the construction of QBQ and the nature of the similarity between QBQ and QBS. In the worst case, QBQ is computed by applying all the grouping operations of QBQ applied to the minimum slice of QBS that contains the elements in the GROUP BY clause of QBQ plus any predicates that QBQ contains and QBS does not.

First, the construction of slices is defined. A slice for elements <A1, A2, . . . , AN> from QBS that contains grouping sets for many combinations of <A1, A2, . . . , AN, B1, B2, . . . , BM> can be computed with the following query:

```
SELECT A1, A2, ..., AN, AGG_FCN1, AGG_FNCZ
FROM QBS
WHERE <ENUMERATED CLAUSE> AND
   <COLLAPSED CLAUSE>
```

An <ENUMERATED CLAUSE> is the conjunction of clauses:

<A1 CLAUSE> AND <A2 CLAUSE> AND . . . <AN CLAUSE> where each <AI CLAUSE>is defined as:

IF GROUPING(AI) IS IN THE RESULT OF QBS,
THEN <AI CLAUSE> IS "GROUPING(A1)=0"
ELSE IF AI IS NOT NULLABLE,

THEN <AI CLAUSE> IS "AI IS NOT NULL"
ELSE QBQ CANNOT BE DERIVED FROM THE RESULTS OF QBS

A <COLLAPSED CLAUSE> is the conjunction of clauses:
<B1 CLAUSE>, <B2 CLAUSE>, ... <BM CLAUSE>
where <BI CLAUSE> is defined as:
IF GROUPING(BI) IS IN THE RESULT OF QBS,
THEN <BI CLAUSE> IS "GROUPING(BI)=1"
ELSE IF BI IS NOT NULLABLE,
THEN <BI CLAUSE> IS "BI IS NULL"
ELSE QBQ CANNOT BE DERIVED FROM THE RESULTS OF QBS If QBQ and QBS are defined exactly the same as grouping sets with exactly the same input, then QBQ results are computed as a simple select of the corresponding columns from QBS that are in the output of QBQ.

If QBQ is a simple GROUP BY clause and QBQ does not have any predicates that QBS does not have or the predicates only involve columns in the GROUP BY elements of QBQ, then QBQ is computed from QBS by constructing a slice from QBS of the elements in the simple GROUP BY clause of QBQ.

If QBQ is a simple GROUP BY clause with elements <E1, E2, ..., EN> which contains predicates P1, ..., PK that QBS does not have, and <F1, F2, ..., FM> are the columns different from <E1, ..., EN> required to compute those predicates, then QBQ is computed from QBS by constructing a slice from QBS for elements <E1, ..., EN, F1, ..., FM>, applying the predicates P1, ..., PK to the results of this slice, and then applying the GROUP BY clause of QBQ with appropriately substituted re-aggregations as understood by the prior art.

If QBQ is a non-simple GROUP BY clause that differs (ignoring order) from the non-simple GROUP BY clause of QBS only in that the ROLLUPs contained in the GROUP BY clause of QBQ are order sensitive prefixes of their corresponding rollups in QBS, and QBQ does not contain predicates that are not also contained in QBS, then QBQ is computed from QBS by constructing a slice of QBS that contains only collapsed clauses for the elements in the ROLLUPs of QBS that are not in the prefixes of the corresponding ROLLUPs in QBQ. No regrouping is required.

Consider the following example. Suppose the GROUP BY clause of QBS is the following:

```
SELECT A,B,C,D,E,F,G,
    GROUPING(A) AS G_A,
    GROUPING(B) AS G_B,
    GROUPING(C) AS G_C,
    SUM(X) AS SUM_X
FROM T
GROUP BY ROLLUP(A,B,C), D, ROLLUP(E,F), G
``` where E and F are non-nullable columns. The query QBQ is:
SELECT A,D,E,G, SUM(X)
FROM T
GROUP BY ROLLUP(E), G, ROLLUP(A), D
Then, QBQ can be constructed from QBS as follows:
SELECT A,D,E,G,SUM_X
FROM QBS
WHERE G_B==1 AND G_C==1 AND F IS NULL If QBQ is a non-simple GROUP BY clause with elements <E1, E2, ..., EN> which contains predicates P1, ..., PK that QBS does not have, and <F1, F2, ..., FM> are the columns different from <E1, ..., EN> required to compute those predicates and no other optimizations apply, then QBQ is computed from QBS by constructing a slice from QBS for elements <E1, ..., EN, F1, ..., FM >, applying the predicates P1, ..., PK to the results of this slice, and then applying the GROUP BY clause of QBQ with appropriately substituted re-aggregations as understood by the prior art.

In order to apply the query block by query block approach to multiple query blocks, the RDBMS software must: (1) determine column mappings across multiple layers of query blocks; (2) analyze contextual information about the derivation of the column mappings; and (3) determine information about column propagation through multiple layers of query blocks. These are required as the RDBMS software is determining subsumption in a bottom up fashion and to ensure the necessary expressions are propagated through multiple layers of query blocks to the results of the summary table (e.g., Q3 mentioned above).

The approach presented in the preferred embodiment of the present invention for the multiple query blocks logic is as follows, starting at the bottom-most query blocks:

1. Determine the contextual information required for the subsumption test between a query block in the summary table definition QBS and a query block in the query QBQ. The contextual information for column mappings consists of three properties. The first property defines if the column mapping can be used for matching. In this case, the column of the QBS that maps to the column of the QBQ is a substitution for the column of the QBQ. The case where this distinction becomes important is in the results of a compensated GROUP BY. All mappings between grouping columns are substitutions. All mappings between aggregate columns are non-substitutions. Hence, any uses of the aggregate columns above the GROUP BY cannot be used to match expressions between the QBS and the QBQ. The second property of a column mapping defines if the column in the QBS can be referenced by the QBQ. When the column in the QBS can be referenced by the QBQ, it is said to be routable. Otherwise, it is non-routable. The case where this distinction becomes important is again above a compensated GROUP BY. In general, expressions introduced above the compensated GROUP BY are not used by the QBQ and hence are non-routable. Rather, they are recomputed from their routable sub-expressions. They are recorded as substitutions so that they can be used for matching above the compensated GROUP BY for the purposes of matching predicates and deriving other non-routable substitutions. On the other hand, the aggregate value in the QBS is routable (which is not a substitution) as it must be used to compute the final aggregation in the QBQ. The third property is not actually carried with the mapping, but derived at the time the mapping is created. This property determines if the column in the QBS is propagated to the materialized results of the QBS. This property is required for all routable mappings.

2. Perform the subsumption test between QBS and QBQ using the contextual information; columns whose mappings do not have the substitution property cannot appear in predicates of the QBS and cannot appear as grouping columns. All expression matching (for predicates and for determining other column mappings) uses only those columns whose mappings have the substitution property. When there is a compensated GROUP BY operation, the rows produced by the GROUP BY operation in the QBS must not be duplicated.

3. Repeat steps 1 and 2 in bottom-up and in pair-wise fashion between the summary table definition and the query until the topmost query block in the summary table definition is reached.

Block 606 is a decision block that represents the computer system 100 determining whether the query should be rewritten to take advantage of one or more of the summary tables. If so, control transfers to Block 608; otherwise, control transfers to Block 610.

Block 608 represents the computer system 100 rewriting the query to use the identified summary tables for answering the query. Specifically, this Block compensates complex expressions using the summary table as they are identified in Block 604, wherein the expressions can be re-derived from one or more of the columns of the summary table.

Block 610 represents the computer system 100 executing the rewritten query.

After these query transformation steps are performed, block 612 returns control to block 204 in FIG. 2 or block 314 in FIG. 3 for subsequent processing steps, including the execution of the SQL query against the relational database and the output of the result set.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method, apparatus, and article of manufacture for a method, apparatus, and article of manufacture for optimizing database queries using a derived summary table, wherein the definition of the summary table is based on a full select statement, including, but not limited to, a derived table involving GROUP BY operations that compute cubes, rollups, grouping sets, and concatenations of cubes, rollups, grouping sets, and grouping items. A query is analyzed using subsumption tests between the query and the definition of the summary table (that is, a query by itself) to determine whether expressions occurring anywhere in the query, but not in the summary table, can be derived using the content in the summary table, and hence the query is subsumed by the summary table definition. An expression in the query is subsumed by and compensated by the summary table when the expression can be re-derived from one or more of the columns of the summary table.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of optimizing a query in a computer system, the query being performed by the computer system to retrieve data from a database stored on the computer system, the method comprising the steps of:

(a) analyzing a query in the computer system using subsumption tests between the query and at least one summary table that comprises a cube index to determine whether an expression in the query can be subsumed by the summary table, wherein the summary table stores at least one materialized view involving at least one GROUP BY operation that computes at least one of the following: (1) a cube, (2) a rollup, (3) a grouping set; and (4) a concatenation of cubes, rollups, grouping sets and one or more grouping items; and (b) when the expression in the query can be subsumed in the summary table, rewriting the query using a slice of the cube index.

2. The method of claim 1, further comprising the step of executing the rewritten query.

3. The method of claim 1, wherein the rewriting step further comprises the step of rerouting the query using the slice of the cube index.

4. The method of claim 3, further comprising the step of selecting the slice from the cube index that contains columns required to evaluate any predicates in the query that are not subsumed by the summary table and reapplying the predicate to produce answers for the query.

5. The method of claim 1, further comprising the step of regrouping to produce answers for the query.

6. The method of claim 1, wherein QBS is a query block in a definition of the summary table and QBQ is a query block in the query.

7. The method of claim 6, wherein the analyzing step further comprises:

if QBQ and QBS are GROUP BYs, then QBQ must not reference columns that are not derivable from the results of QBS, and the grouping items in QBS must contain a slice that supports the grouping items in QBQ.

8. The method of claim 7, wherein an aggregate function in QBQ must be computable using a set of columns in the result of QBS as intermediate results.

9. The method of claim 8, wherein the QBS is a simple GROUP BY, and the analyzing step further comprises:

if QBQ computes a distinct aggregate function, then an argument for the distinct aggregate function must be a grouping item in QBS.

10. The method of claim 7, wherein a "simple" GROUP BY clause contains one or more grouping sets comprised of single expression elements in the GROUP BY clause.

11. The method of claim 10, wherein a "non-simple" GROUP BY clause is a GROUP BY clause with a grouping sets specification or a GROUP BY clause whose elements include those that specify a CUBE or ROLLUP operation.

12. The method of claim 11, wherein the analyzing step further comprises:

if QBS is a non-simple GROUP BY clause and QBQ is a simple GROUP BY clause, then QBS contains a slice that supports the grouping items in QBQ if the resulting grouping sets of QBS contains a grouping set whose elements are a superset of the grouping items in QBQ and any columns required in QBQ to apply predicates that are not in QBS.

13. The method of claim 11, wherein the analyzing step further comprises:

if QBS is a non-simple GROUP BY clause and QBQ is a non-simple GROUP BY clause, then QBS contains a slice that supports QBQ if the resulting grouping sets of QBS contains a grouping set whose elements are a superset of the grouping items in the QBQ and any columns required in the QBQ to apply predicates that are not in QBS.

14. The method of claim 13, wherein QBQ is computed by applying all the grouping operations of QBQ applied to the minimum slice of QBS that contains the elements in the GROUP BY clause of QBQ plus any predicates that QBQ contains and QBS does not.

15. The method of claim 13, wherein the analyzing step further comprises:

if QBQ and QBS are defined with exactly the same grouping sets with exactly the same input, then QBQ results are computed as a simple select of the corresponding columns from QBS that are in the output of QBQ.

16. The method of claim 13, wherein the analyzing step further comprises:

if QBQ is a simple GROUP BY clause and QBQ does not have any predicates that QBS does not have or the predicates only involve columns in the GROUP BY elements of QBQ, then QBQ is computed from QBS by constructing a slice from QBS of the elements in the simple GROUP BY clause of QBQ.

17. The method of claim 13, wherein the analyzing step further comprises:

if QBQ is a simple GROUP BY clause with elements <E1, E2, ..., EN> that contains predicates P1, ..., PK that QBS does not have, and <F1, F2, ..., FM> are the columns different from <E1, ..., EN> required to compute those predicates, then QBQ is computed from QBS by constructing a slice from QBS for elements <E1, ..., EN, F1, ..., FM>, applying the predicates P1, PK to the results of this slice, and then applying the GROUP BY clause of QBQ with appropriately substituted re-aggregations.

18. The method of claim 13, wherein the analyzing step further comprises:

if QBQ is a non-simple GROUP BY clause that differs from the non-simple GROUP BY clause of QBS only in that the rollups contained in the GROUP BY clause of QBQ are order sensitive prefixes of their corresponding rollups in QBS, and QBQ does not contain predicates that are not also contained in QBS, then QBQ is computed from QBS by constructing a slice of QBS that contains only collapsed clauses for the elements in the rollups of QBS that are not in the prefixes of the corresponding rollups in QBQ.

19. The method of claim 13, wherein the analyzing step further comprises:

if QBQ is a non-simple GROUP BY clause with elements <E1, E2, ..., EN> that contains predicates P1, ..., PK that QBS does not have, and <F1, F2, ..., FM> are the columns different from <E1, ..., EN> required to compute those predicates and no other optimizations apply, then QBQ is computed from QBS by constructing a slice from QBS for elements <E1, ..., EN, F1, ..., FM>, applying the predicates P1, ..., PK to the results of this slice, and then applying the GROUP BY clause of QBQ with appropriately substituted re-aggregations.

20. A computer-implemented apparatus for optimizing a query, comprising:

(a) a computer system;

(b) means, performed by the computer system, for analyzing a query using subsumption tests between the query and at least one summary table that comprises a cube index to determine whether an expression in the query can be subsumed by the summary table, wherein the summary table stores at least one materialized view involving at least one GROUP BY operation that computes at least one of the following: (1) a cube, (2) a rollup, (3) a grouping set; and (4) a concatenation of cubes, rollups, grouping sets and one or more grouping items; and (b) means, performed by the computer system, for rewriting the query using a slice of the cube index, when the expression in the query can be subsumed in the summary table.

21. The apparatus of claim 20, further comprising means for executing the rewritten query.

22. The apparatus of claim 20, wherein the means for rewriting further comprises means for rerouting the query using the slice of the cube index.

23. The apparatus of claim 22, further comprising means for selecting the slice from the cube index that contains columns required to evaluate any predicates in the query that are not subsumed by the summary table and for reapplying the predicate to produce answers for the query.

24. The apparatus of claim 20, further comprising means for regrouping to produce answers for the query.

25. The apparatus of claim 20, wherein QBS is a query block in a definition of the summary table and QBQ is a query block in the query.

26. The apparatus of claim 25, wherein the means for analyzing further comprises:

if QBQ and QBS are GROUP BYs, then QBQ must not reference columns that are not derivable from the results of QBS, and the grouping items in QBS must contain a slice that supports the grouping items in QBQ.

27. The apparatus of claim 26, wherein an aggregate function in QBQ must be computable using a set of columns in the result of QBS as intermediate results.

28. The apparatus of claim 27, wherein the QBS is a simple GROUP BY, and the means for analyzing further comprises:

if QBQ computes a distinct aggregate function, then an argument for the distinct aggregate function must be a grouping item in QBS.

29. The apparatus of claim 26, wherein a "simple" GROUP BY clause contains one or more grouping sets comprised of single expression elements in the GROUP BY clause.

30. The apparatus of claim 29, wherein a "non-simple" GROUP BY clause is a GROUP BY clause with a grouping sets specification or a GROUP BY clause whose elements include those that specify a CUBE or ROLLUP operation.

31. The apparatus of claim 30, wherein the means for analyzing further comprises:

if QBS is a non-simple GROUP BY clause and QBQ is a simple GROUP BY clause, then QBS contains a slice that supports the grouping items in QBQ if the resulting grouping sets of QBS contains a grouping set whose elements are a superset of the grouping items in QBQ and any columns required in QBQ to apply predicates that are not in QBS.

32. The apparatus of claim 31, wherein the means for analyzing further comprises:

if QBS is a non-simple GROUP BY clause and QBQ is a non-simple GROUP BY clause, then QBS contains a slice that supports QBQ if the resulting grouping sets of QBS contains a grouping set whose elements are a superset of the grouping items in the QBQ and any columns required in the QBQ to apply predicates that are not in QBS.

33. The apparatus of claim 32, wherein QBQ is computed by applying all the grouping operations of QBQ applied to the minimum slice of QBS that contains the elements in the GROUP BY clause of QBQ plus any predicates that QBQ contains and QBS does not.

34. The apparatus of claim 32, wherein the means for analyzing further comprises:

if QBQ and QBS are defined with exactly the same grouping sets with exactly the same input, then QBQ results are computed as a simple select of the corresponding columns from QBS that are in the output of QBQ.

35. The apparatus of claim 32, wherein the means for analyzing further comprises:

if QBQ is a simple GROUP BY clause and QBQ does not have any predicates that QBS does not have or the predicates only involve columns in the GROUP BY elements of QBQ, then QBQ is computed from QBS by constructing a slice from QBS of the elements in the simple GROUP BY clause of QBQ.

36. The apparatus of claim 32, wherein the means for analyzing further comprises:

if QBQ is a simple GROUP BY clause with elements <E1, E2, ..., EN> that contains predicates P1, ..., PK that QBS does not have, and <F1, F2, ..., FM> are the columns different from <E1, ..., EN> required to compute those predicates, then QBQ is computed from QBS by constructing a slice from QBS for elements <E1, ..., EN, F1, ..., FM>, applying the predicates P1, ..., PK to the results of this slice, and then applying the GROUP BY clause of QBQ with appropriately substituted re-aggregations.

37. The apparatus of claim 32, wherein the means for analyzing further comprises:

if QBQ is a non-simple GROUP BY clause that differs from the non-simple GROUP BY clause of QBS only in that the rollups contained in the GROUP BY clause of QBQ are order sensitive prefixes of their corresponding rollups in QBS, and QBQ does not contain predicates that are not also contained in QBS, then QBQ is computed from QBS by constructing a slice of QBS that contains only collapsed clauses for the elements in the rollups of QBS that are not in the prefixes of the corresponding rollups in QBQ.

38. The apparatus of claim 32, wherein the means for analyzing further comprises:

if QBQ is a non-simple GROUP BY clause with elements <E1, E2, ..., EN> that contains predicates P1, ..., PK that QBS does not have, and <F1, F2, ..., FM> are the columns different from <E1, ..., EN> required to compute those predicates and no other optimizations apply, then QBQ is computed from QBS by constructing a slice from QBS for elements <E1, ..., EN, F1, ..., FM>, applying the predicates P1, ..., PK to the results of this slice, and then applying the GROUP BY clause of QBQ with appropriately substituted re-aggregations.

39. An article of manufacture embodying logic for performing method steps for optimizing a query, the query being performed by a computer system to retrieve data from a database stored in a data storage device coupled to the computer system, the method comprising the steps of:

(a) analyzing a query in the computer system using subsumption tests between the query and at least one summary table that comprises a cube index to determine whether an expression in the query can be subsumed by the summary table, wherein the summary table stores at least one materialized view involving at least one GROUP BY operation that computes at least one of the following: (1) a cube, (2) a rollup, (3) a grouping set; and (4) a concatenation of cubes, rollups, grouping sets and one or more grouping items; and (b) when the expression in the query can be subsumed in the summary table, rewriting the query using a slice of the cube index.

40. The method of claim 39, further comprising the step of executing the rewritten query.

41. The method of claim 39, wherein the rewriting step further comprises the step of rerouting the query using the slice of the cube index.

42. The method of claim 41, further comprising the step of selecting the slice from the cube index that contains columns required to evaluate any predicates in the query that are not subsumed by the summary table and reapplying the predicate to produce answers for the query.

43. The method of claim 39, further comprising the step of regrouping to produce answers for the query.

44. The method of claim 39, wherein QBS is a query block in a definition of the summary table and QBQ is a query block in the query.

45. The method of claim 44, wherein the analyzing step further comprises:

if QBQ and QBS are GROUP BYs, then QBQ must not reference columns that are not derivable from the results of QBS, and the grouping items in QBS must contain a slice that supports the grouping items in QBQ.

46. The method of claim 45, wherein an aggregate function in QBQ must be computable using a set of columns in the result of QBS as intermediate results.

47. The method of claim 46, wherein the QBS is a simple GROUP BY, and the analyzing step further comprises:

if QBQ computes a distinct aggregate function, then an argument for the distinct aggregate function must be a grouping item in QBS.

48. The method of claim 45, wherein a "simple" GROUP BY clause contains one or more grouping sets comprised of single expression elements in the GROUP BY clause.

49. The method of claim 48, wherein a "non-simple" GROUP BY clause is a GROUP BY clause with a grouping sets specification or a GROUP BY clause whose elements include those that specify a CUBE or ROLLUP operation.

50. The method of claim 49, wherein the analyzing step further comprises:

if QBS is a non-simple GROUP BY clause and QBQ is a simple GROUP BY clause, then QBS contains a slice that supports the grouping items in QBQ if the resulting grouping sets of QBS contains a grouping set whose elements are a superset of the grouping items in QBQ and any columns required in QBQ to apply predicates that are not in QBS.

51. The method of claim 49, wherein the analyzing step further comprises:

if QBS is a non-simple GROUP BY clause and QBQ is a non-simple GROUP BY clause, then QBS contains a slice that supports QBQ if the resulting grouping sets of QBS contains a grouping set whose elements are a superset of the grouping items in the QBQ and any columns required in the QBQ to apply predicates that are not in QBS.

52. The method of claim 51, wherein QBQ is computed by applying all the grouping operations of QBQ applied to the minimum slice of QBS that contains the elements in the GROUP BY clause of QBQ plus any predicates that QBQ contains and QBS does not.

53. The method of claim 51, wherein the analyzing step further comprises:
 if QBQ and QBS are defined with exactly the same grouping sets with exactly the same input, then QBQ results are computed as a simple select of the corresponding columns from QBS that are in the output of QBQ.

54. The method of claim 51, wherein the analyzing step further comprises:
 if QBQ is a simple GROUP BY clause and QBQ does not have any predicates that QBS does not have or the predicates only involve columns in the GROUP BY elements of QBQ, then QBQ is computed from QBS by constructing a slice from QBS of the elements in the simple GROUP BY clause of QBQ.

55. The method of claim 51, wherein the analyzing step further comprises:
 if QBQ is a simple GROUP BY clause with elements <E1, E2, ..., EN> that contains predicates P1, ..., PK that QBS does not have, and <F1, F2, ..., FM> are the columns different from <E1, ..., EN> required to compute those predicates, then QBQ is computed from QBS by constructing a slice from QBS for elements <E1, ..., EN, F1, ..., FM>, applying the predicates P1, ..., PK to the results of this slice, and then applying the GROUP BY clause of QBQ with appropriately substituted re-aggregations.

56. The method of claim 51, wherein the analyzing step further comprises:
 if QBQ is a non-simple GROUP BY clause that differs from the non-simple GROUP BY clause of QBS only in that the rollups contained in the GROUP BY clause of QBQ are order sensitive prefixes of their corresponding rollups in QBS, and QBQ does not contain predicates that are not also contained in QBS, then QBQ is computed from QBS by constructing a slice of QBS that contains only collapsed clauses for the elements in the rollups of QBS that are not in the prefixes of the corresponding rollups in QBQ.

57. The method of claim 51, wherein the analyzing step further comprises:
 if QBQ is a non-simple GROUP BY clause with elements <E1, E2, ..., EN> that contains predicates P1, ..., PK that QBS does not have, and <F1, F2, ..., FM> are the columns different from <E1, ..., EN> required to compute those predicates and no other optimizations apply, then QBQ is computed from QBS by constructing a slice from QBS for elements <E1, ..., EN, F1, ..., FM>, applying the predicates P1, ..., PK to the results of this slice, and then applying the GROUP BY clause of QBQ with appropriately substituted re-aggregations.

* * * * *

UNITED STATES PATENT AND TRADEMARK OFFICE
CERTIFICATE OF CORRECTION

PATENT NO.     : 6,560,594 B2
DATED          : May 6, 2003
INVENTOR(S)    : Roberta Jo Cochrane et al.

It is certified that error appears in the above-identified patent and that said Letters Patent is hereby corrected as shown below:

Title page,
Item [56], References Cited, U.S. PATENT DOCUMENTS, insert
-- 5,794,228      8/1998      French et al.
   5,890,150     3/1999      Ushijima et al. --

OTHER PUBLICATIONS, insert

--U.C. Park et al, "A Logical Derivation of Summary Tables for Statistical Database Systems", Journal of the Korea Information of Science Society, Vol. 19, No. 5, pp. 477-486, September 1992 (ABSTRACT only – 1 pp).
V. Harinarayan et al, "Implementing Data Cubes Efficiently", SIGMOD Record, Vol. 25, No. 2, pp. 205-216, June 1996 (ABSTRACT only – 1 pp).
J.D. Ullman, "Efficient Implementation of Data Cubed Via Materialized Views", KDD-96 Proceedings: Second International conference on Knowledge Discovery and Data Mining, pp. 386-388, Published AAAI Press Menlo Park, CA USA, 1996 (ABSTRACT only – 12 pp).
L.S. Colby, R.I. Cole, E. Haslam, H. Jazaeri, G. Johnson, W.J. McKenna, L. Schumacher, D. Wilhite, Red Brick Vista: Aggregate Computation and Management, Proceedings of the $14^{th}$ Int'l. Conference on Data Engineering, Orlando, FL., 1998.
R. Bello, K. Dias, A. Downing, J. Feenan, J. Finnerty, W. Norcott, H. Sun, A. Wirkowski, M. Ziauddin. Materialized Views In Oracle. Proceedings of the $24^{th}$ VLDB Conference, New York, 1998.
D. Srivastava, S. Dar, H. Jagadish, A. Levy. Answering Queries with Aggregation Using Views. Proceedings of the $22^{nd}$ VLDB Conference, Mumbai, India, 1996.
R. Cochrane and N. Mattos. Super Sets – Concatenation and Grouping Sets. ISO Document DBL LGW-34 X3H2-97-, July 23, 2997. This should also be in the currently published version of the SQL3 standard.
H. Pirahesh, J.M. Hellerstein, Waqar Hasan, "Extensible/Rule Based Query Rewrite...Starburst,"ACM SIGMOD (1992) pp. 39-48.--

Item [57], ABSTRACT,
Line 7, after "GROUP BY operation that", "computes" should read -- comprises --.

Signed and Sealed this

Twenty-fifth Day of November, 2003

JAMES E. ROGAN
*Director of the United States Patent and Trademark Office*